(12) United States Patent
Gare

(10) Patent No.: US 10,547,891 B2
(45) Date of Patent: Jan. 28, 2020

(54) APPARATUSES SYSTEMS, AND METHODS FOR ADDING FUNCTIONALITIES TO CONTROL BUTTONS ON A REMOTE CONTROL DEVICE

(71) Applicant: SLING MEDIA PVT LTD, Bengaluru (IN)

(72) Inventor: Gautam Rajendrakumar Gare, Bengaluru (IN)

(73) Assignee: SLING MEDIA PVT LTD, Bengaluru (IN)

( * ) Notice: Subject to any disclaimer, the term of this patent is extended or adjusted under 35 U.S.C. 154(b) by 0 days.

(21) Appl. No.: 15/988,899

(22) Filed: May 24, 2018

(65) Prior Publication Data
US 2019/0200068 A1 Jun. 27, 2019

(30) Foreign Application Priority Data
Dec. 26, 2017 (IN) .............................. 201741046555

(51) Int. Cl.
*H04N 21/422* (2011.01)
(52) U.S. Cl.
CPC .............................. *H04N 21/4221* (2013.01)
(58) Field of Classification Search
CPC ....... H04N 21/42208; H04N 21/42225; H04N 21/42226; H04N 21/42218; H04N 21/8186; H04N 21/42222; H04N 21/42204; H04N 21/4222; H04N 21/42224; H04N 21/42228
See application file for complete search history.

(56) References Cited

U.S. PATENT DOCUMENTS

| | | | |
|---|---|---|---|
| 2011/0149158 A1* | 6/2011 | Cooper | H04N 5/44 348/552 |
| 2015/0007232 A1* | 1/2015 | Martch | G08C 17/02 725/44 |
| 2017/0127114 A1* | 5/2017 | Lee | H04N 21/4312 |

* cited by examiner

Primary Examiner — Nathan J Flynn
Assistant Examiner — Christen A Kurien
(74) Attorney, Agent, or Firm — Lorenz & Kopf LLP

(57) ABSTRACT

Apparatuses, methods and systems to enable display of media content, the apparatus includes: a remote control device; a button pad with a set of buttons for controlling a media player device wherein the set of buttons comprises at least a plurality of buttons to navigate an user interface on a display device, and to display streaming media content on the display device wherein the button pad is part of the remote control device, the button pad further includes: a first set of buttons ordinarily designated to navigate the user interface; and a second set of buttons ordinarily designated to play streaming media content wherein the second set of buttons further configured for use to navigate the user interface with the first set of buttons.

17 Claims, 6 Drawing Sheets

APPARATUSES SYSTEMS, AND METHODS FOR ADDING FUNCTIONALITIES TO CONTROL BUTTONS ON A REMOTE CONTROL DEVICE

PRIORITY CLAIM

This application claims the benefit of India Provisional Patent Application No. 201741046555, filed on Dec. 26, 2017.

TECHNICAL FIELD

This document generally relates to use of control buttons on a remote controller and more particularly to adding functionalities to control buttons ordinarily dedicated to control only streaming media on a remote control device.

BACKGROUND

An online media distribution service, such as the service currently available at www.sling.com, distributes content that is obtained from one or more sources to viewers over the Internet or a similar network. Distributed content may include television content, movies, other audio/visual content, audio content and/or the like. Typically, viewers can connect to the online distribution service using a conventional web browser or other client to obtain streaming or file-based content as desired. Because users of such services typically demand a large variety of content, such distribution services often receive their distributed content from any number of different production sources, syndicators, web-based services and/or other media sources as appropriate.

A variety of remote control devices are available to navigate on screen user interfaces of media files from content sources for such online media distribution services such as www.sling.com. Attempts have been made to configure these remote control devices with a reduced numbers of buttons while still enabling operational functionalities such as navigating through content in an on screen user interface or controlling the streaming media from a media distribution service. In general, these remote control devices use a reduced button set configured in a first part for navigating the user interface and in a second part for operating the streaming media. When navigating the user interface the control buttons for managing the streamed media are not operational.

As a result, it is desirable to have multi-functional button controls on the remote control device that do not add additional control buttons but allow for control of the streaming media for navigating the on screen user interface along with the other navigation buttons customarily used for navigating the on screen user interface. These and other desirable features and characteristics will become apparent from the subsequent detailed description and the appended claims, taken in conjunction with the accompanying drawings and this background section.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

BRIEF SUMMARY

Figure 1:
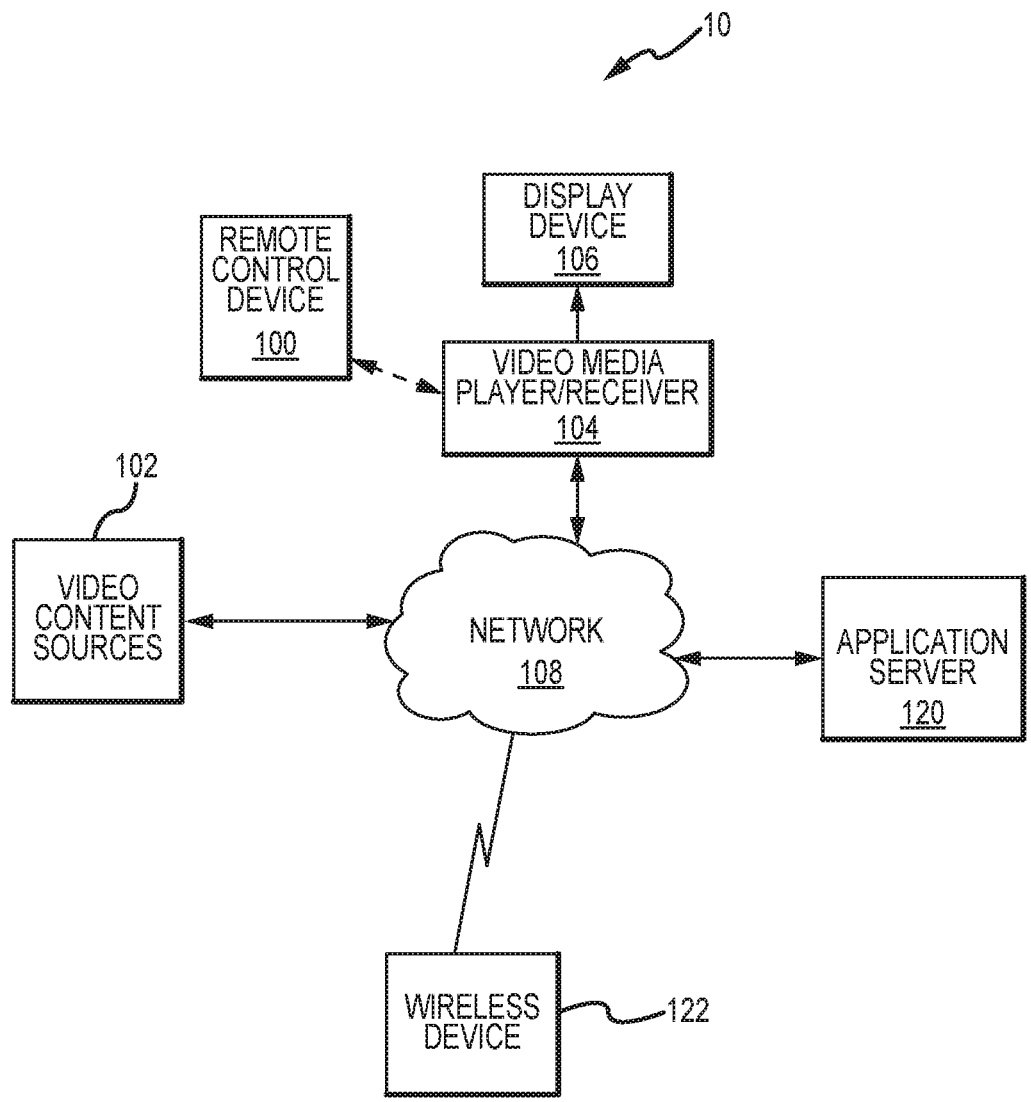
FIG. 1 is a diagram of the remote control device system in accordance with an embodiment.

Apparatuses, methods and systems for a remote control device for navigating an on screen user interface and controlling playing of streaming media content using a reduced number of buttons with the aid of multi-function buttons that can be used for both navigation of the user interface and playing of the streaming media content.

In one embodiment, an apparatus to enable display of media content is disclosed, the apparatus includes: a remote control device; a button pad with a set of buttons for controlling a media player device wherein the set of buttons includes at least a plurality of buttons to navigate an user interface on a display device, and to display streaming media content on the display device wherein the button pad is part of the remote control device, the button pad further includes: a first set of buttons ordinarily designated to navigate the user interface; and a second set of buttons ordinarily designated to play streaming media content wherein the second set of buttons further configured for use to navigate the user interface with the first set of buttons.

The apparatus further includes: an user interface with at least a first and second level wherein the first level is associated with a category and the second level is associated with a subcategory. The apparatus further includes: a second set of buttons to navigate the first level of the user interface in a horizontal or vertical direction, and to play a particular streamed media content selected in the second level by the first set of buttons. The apparatus further includes: a first set of buttons to navigate the second level of the user interface in the horizontal and vertical to select particular streamed media content. The first level are items which comprise categories of plurality of applications and time periods for particular applications associated with streamed media content. The second level are sub-categories which comprise types of streamed media content of programs, shows, and channels.

In another embodiment, a method of managing displaying of media content is disclosed which includes: configuring a remote control device with a button pad with a set of buttons for controlling a media player device wherein the set of buttons comprises at least a plurality of buttons to navigate an user interface on a display device, and to display streaming media content on the display device, the button pad further includes: configuring a first set of buttons to navigate the user interface; and configuring a second set of buttons to play streaming media content and to navigate the user interface with the first set of buttons.

The second set of button are multi-function buttons enabling in one mode to navigate the user interface and in another mode to play streaming media content.

The method further includes: configuring an user interface with at least a first and second level wherein the first level is associated with a category and the second level is associated with a subcategory. The method further includes: configuring a second set of buttons to navigate the first level of the user interface in a horizontal or vertical direction, and to play a particular streamed media content selected in the second level by the first set of buttons. The method further includes: configuring a first set of buttons to navigate the second level of the user interface in the horizontal and vertical to select particular streamed media content. The first level are items which comprise categories of plurality of applications and time periods for particular applications associated with streamed media content. The second level are sub-categories which comprise types of streamed media content of programs, shows, and channels. The method includes: updating functionalities of the first and second sets of buttons by downloading software applications by communications with a network t for configuring at least the second set of buttons to navigate the user interface and to play streaming media content.

In yet another embodiment, a video presentation system is disclosed which includes: a receiver to receive data associated with streaming media content; a display operatively coupled to the receiver for presenting the streaming media content; and a remote control operatively coupled to the receiver with a set of buttons that performs more than one type of action of actions associated with controlling the display of the streaming media content and associated with navigating an application screen for selection of streaming media content.

The set of buttons further includes: a first set of buttons ordinarily designated to navigate the application screen; and a second set of buttons ordinarily designated to play streaming media content wherein the second set of buttons further configured for use to navigate the application screen with the first set of buttons. The system further includes: an application screen with at least a first and second level wherein the first level is associated with a category and the second level is associated with a subcategory. The system further includes: a second set of buttons to navigate the first level of the user interface in a horizontal or vertical direction, and to play a particular streamed media content selected in the second level by the first set of buttons. The system further includes: a first set of buttons to navigate the second level of the user interface in the horizontal and vertical to select particular streamed media content. The first level are items which include categories of plurality of applications and time periods for particular applications associated with streamed media content, and the second level are sub-categories which include types of streamed media content of programs, shows, and channels.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

References are made throughout this disclosure to buttons on a remote control device that are used for navigation of an user interface and for streaming of media content. Multi-function buttons are defined in part to buttons that perform streaming operations of enabling actions associated with playing a streaming media content from a media player device when a streaming media content is displayed and for performing navigation operations when navigating the user interface by the user. That is, when content is not being streamed, multi-function buttons ordinarily defined to perform actions associated with streaming media content are used for navigating an on screen application and selection of items in the on screen application.

FIG. 1 shows an exemplary remote control device 100 that could be used to control media content from any number of sources. "Media content" refers to any audio, video, audio/visual or other programming in any streaming, file-based or other format. In various embodiment, the remote control device 100 navigates an on screen user interface of a display device 106 which include items displayed of television, movie and/or other audiovisual works in any digital format such as MPEG, Windows Media, Quicktime, Real Media, H.264 and/or the like. Such content may be provided to any number of viewers using any sort of media player 104 which may include a receiver and is controlled by the remote control device 100. In various embodiments, the media playback devices could include desktop or notebook computers, mobile telephones, personal digital assistants, video game players, portable media players and/or any other devices capable of receiving media content via a network and rendering audio and/or visual content to a viewer.

The network 108 is any digital or other communications network capable of transmitting messages between senders (e.g., host server 120) and receivers (e.g., client devices 122). In various embodiments, network 108 includes any number of public or private data connections, links or networks supporting any number of communications protocols. The network 108 may include the Internet, for example, or any other network based upon TCP/IP or other conventional protocols. In various embodiments, network 108 may also incorporate a wireless and/or wired telephone network, such as a cellular communications network for communicating with mobile phones, personal digital assistants, and/or the like. Various embodiments of network 108 may also incorporate any sort of wireless or wired local area networks, such as one or more IEEE 802.3 and/or IEEE 802.11 networks.

The host server 120 is any server or collection of servers capable of providing a front-end or other portal to system 10 that allows viewers to access media content. In various embodiments, host server 120 is a conventional web-type server that provides data to conventional web browsers or other client applications. Such data may be provided over network 108 using conventional TCP/IP, HTTP and/or other protocols as desired. Generally, host server 120 will be implemented across any number of physical and logical hosts. For example, metadata and other visual content may be provided via a typical web portal residing at a well-known URL or other address, whereas streamed or other distributed content may be delivered from a separate host associated with a content delivery network or other provider. Conventional web hosting and development techniques may be applied to create a network host in any manner.

The media content may be received, formatted and made available on host server 120 in any manner. In various embodiments, content is received from any number of different content of sources 102 at a receiving server. Content of sources 102 may include studios or other content creators, syndicators or other content distributors, television networks, production houses, web or other network-based distributors, and/or any number of other content of sources 102 as desired. Content may be delivered across any medium, including any sort of point-to-point or networked link. In various embodiments, the Internet or a similar network 108 may be used to receive content from one or more content of sources 102 as well as to distribute processed content to viewers. Providing content from multiple sources, however, can create a number of challenges. Often, each content source has its own preferred format for transporting new material. Media files may be delivered, for example, in any number of different manners (e.g., RSS, pushed or pulled FTP/TFTP, HTTP and/or the like). Moreover, files may be received in any number of different compressed and/or uncompressed formats that need to be transcoded or otherwise converted before the content is available for distribution to viewers. Further, as viewers use an increasing variety of client devices (e.g., mobile phones, video game players, and other portable devices), it may be desirable to encode/transcode received content into any number of different distribution formats (e.g., formats of different sizes, bit rates, frame rates, resolutions and/or other parameters) to accommodate a variety of viewers and viewing devices. Hence, the types and amounts of transcoding or other processing that may be needed before distributing the received content can be significant.

Moreover, many different content providers have unique formats for the metadata that describes the media content. Most websites provide at least some description of the content that is distributed: this description may include the name of the program, names of actors/actresses, a brief description of the programming, any ratings or parental control information, or any other information as desired. This "metadata" information about the programming content may be provided by the content provider with the media content itself, or it may be retrieved from any other source as desired. In either case, formatting of the metadata can be a significant challenge due to the wide variety of formats that may be used by any number of different data sources.

Although FIG. 1 shows content being received at a host server 120, in practice content may be provided directly from sources 102 to media player 104. The host server 120, when present, suitably receives content from one or more sources 102 and provides the received content to a processing system (not shown) to the media player 104. In embodiments that do provide a receiving host server 120, this server may be any conventional computing system capable of manually and/or automatically receiving content via any sort of pushed or pulled FTP/TFTP session, RSS or other automated syndication, and/or any other techniques.

Metadata about the received content may be obtained from any source. In various embodiments, metadata is obtained from the content of sources 102 with the delivered content itself. In other instances, metadata may be obtained from any sort of database connected to the network 108. The databases may be a web-based or other networked source of information (e.g., a database that can support queries across network). Alternately, the database may be a local database that is not available on network 108.

In some embodiments, host server 120 suitably obtains the content and/or metadata using any relevant transport mode, and then performs a transformer process on the received content to place the received content (and its associated metadata, if appropriate) into a known format, as described more fully below. For example, the transformed content may be formatted as a media bus request (MBR) that is wrapped in an appropriate decorator or other structure for subsequent processing via the network 108. Again, in some embodiments the host server 120 may be partially or wholly eliminated, and content providers of sources 102 could simply provide some or all of their content in the preferred format directly to media player 104 for subsequent processing. Content providers could format MBR or other structures with appropriate decorators, for example. Content could alternately be delivered in any proprietary, open or other agreed-upon format to reduce the need for pre-processing by host server 120, as desired.

Received content may be processed using any sort of processing system. Various embodiments may be implemented using dedicated or shared hardware servers; other implementations may make use of virtual server features as part of a "cloud computing" service, such as any of the cloud computing services provided by AMAZON®, GOOGLE®, MICROSOFT®, IBM®, UBUNTU®, SUN MICROSYSTEMS® and/or any number of other providers. The AMAZON®Web Services (AWS) products and services available from Amazon.com, for example, (described at http://aws.amazon.com/) could be used to implement some or all of processing system in some embodiments, although other embodiments may use any other products or services as desired.

Content and metadata is therefore received from any number of sources as desired. Received content is processed to properly format or otherwise prepare the content for distribution from host server 120 on network 108 to any number of client devices 122.

Continuing with FIG. 1, the remote control device 100 may be used to provide a convenient way to navigate an user interface on screen which displays the media content from the media content service provider. In an exemplary embodiment, the remote control device 100 may be configured with a set of buttons that allow for directional movement to navigate through an user interface. In another exemplary embodiment, the remote control device 100 may include a single bi-directional button to control the user movement and navigation through the user interface. The remote control device 100 may be also used for a variety of operations of operations associated with the streaming media content. In an exemplary embodiment, the remote control device 100 may allow for functions such as play, reverse, forward, stop etc. of the streaming media content. In an exemplary embodiment, the remote control device 100 may separate the buttons for control of the streaming media content operations and the navigating the user interface.

Figure 2:
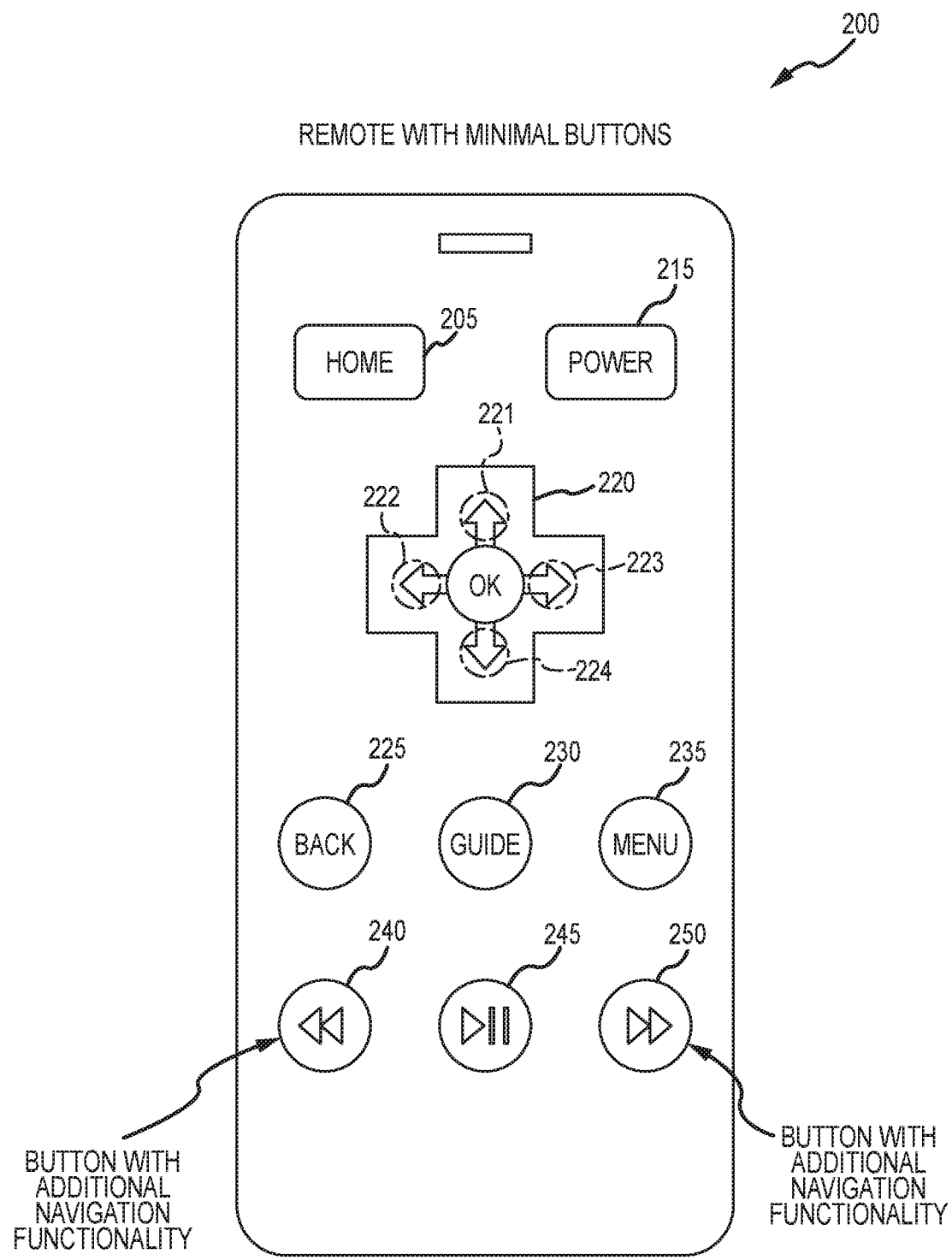
FIG. 2 is a diagram of the remote control device with buttons in accordance with an embodiment.

FIG. 2 is a an exemplary diagram of a remote control device 200 (in reference to remote control device 100 of FIG. 1) where various configurations of the buttons are used for navigating the user interface as well as streaming the media content are illustrate. In addition, an additional button (optional) may be added for actuating a voice recognition service for enabling speech capture of voice commands for navigating the user interface and the controlling the streaming media operations.

In FIG. 2 there is shown a configuration of the remote control device 200 of a first set of buttons for navigating a user interface. The remote control device 200 includes a home button 205, a power button 215, a multi-directional button 220, a back button 225, a guide button 230, a menu button 235, a fast reverse play button 240, a play/stop button 245 and a fast forward play button 250. In exemplary embodiments a first set of buttons may include a multi-directional button 220 that also a user to select a direction for navigating an on screen user interface. The multi-directional button 220 has tabs 221, 222, 223 and 224 for navigating in an up, down, right and left direction on an user interface. For example, if the user desired to select an item in a right direction from the present position of the on screen select feature (not shown), the user may simply actuate or press a corresponding directional tab of the tabs 221, 222, 223, or 224 of the multi-directional button 220 to instruct the on screen select feature to move one item at a time to the desired item. That is, each user action on the multi-directional button would enable a one item movement of the select feature. If the user holds down a tab of the multi-directional button, the select feature would proceed to cross one item at a time in a consecutive manner until the item that the user desires is selected. The multi-directional button 220 enables the user to navigate within a select screen area. For example, this may be a set of items in a sub-category area or a set of items in a category area. The multi-directional button 220 does not cross categories to sub-categories in an user interface unless the user navigates up or down the separate areas. In an exemplary example, the user may direct the select feature from a category area to a sub category area or vice versa to navigate between both areas and select items in each area.

In the remote control device 200, the back button 225 may be used to navigate between different areas or to go back to prior selections. The guide button 230 enables a user to pull up an electronic program guide (EPG) upon actuation of the button regardless of the area in the user interface that the select feature is found. In other words, the guide button 230 provides a short cut to pull up the EPG on screen for the user. During the navigation mode, the fast forward play button 250, the fast reverse play button 240 and the play/stop button 245 are enabled to perform navigation movements in the user interface. In an exemplary embodiment, the user may use these buttons as short cuts to jump to different levels in an user interface, to mimic similar types of operations of the back button 225, the guide button 230 or the menu button 235. For example, the fast reverse play button 240 may be programmed to skip more than one step in a back operation that is performed in single steps by the back button 225. In another exemplary embodiment, the fast reverse play button 240 may be used to navigate multiple consecutive items by a single actuation rather than the single item movement performed by the actuation of the various tabs 221, 222, 223, and 224 of the multi-directional button 220. That is, the fast reverse play button 240 and the fast forward play button 250 may skip multiple consecutive items by a single actuation enabling a user to more quickly navigate an user interface. In various other embodiments, the play/stop button 245 may navigate different hours, days in the EPG. For example, upon a user actuating the play/stop button 245, the user may proceed to the next page or prior page in an EPG displayed on screen. In addition, the user may be enabled by the play/stop button 245 to skip to the next day in the EPG or the prior day or may be used as a shortcut to view recorded programs.

In various exemplary embodiments, the user may be self-configure the fast forward play button 250, the fast reverse play button 240 and the play/stop button 245. That is, on screen menus (not shown) may be provided to allow the user to configure various functional operations for each of the buttons as the user desires. In an example, the user may select an operation from a pull down list of commands to be associated with each of the buttons that are used in the streaming functions. In this instance, the buttons would perform functions related to commands in the navigation mode when the user is navigating the media content and the on screen items in the user interface.

Figure 3:
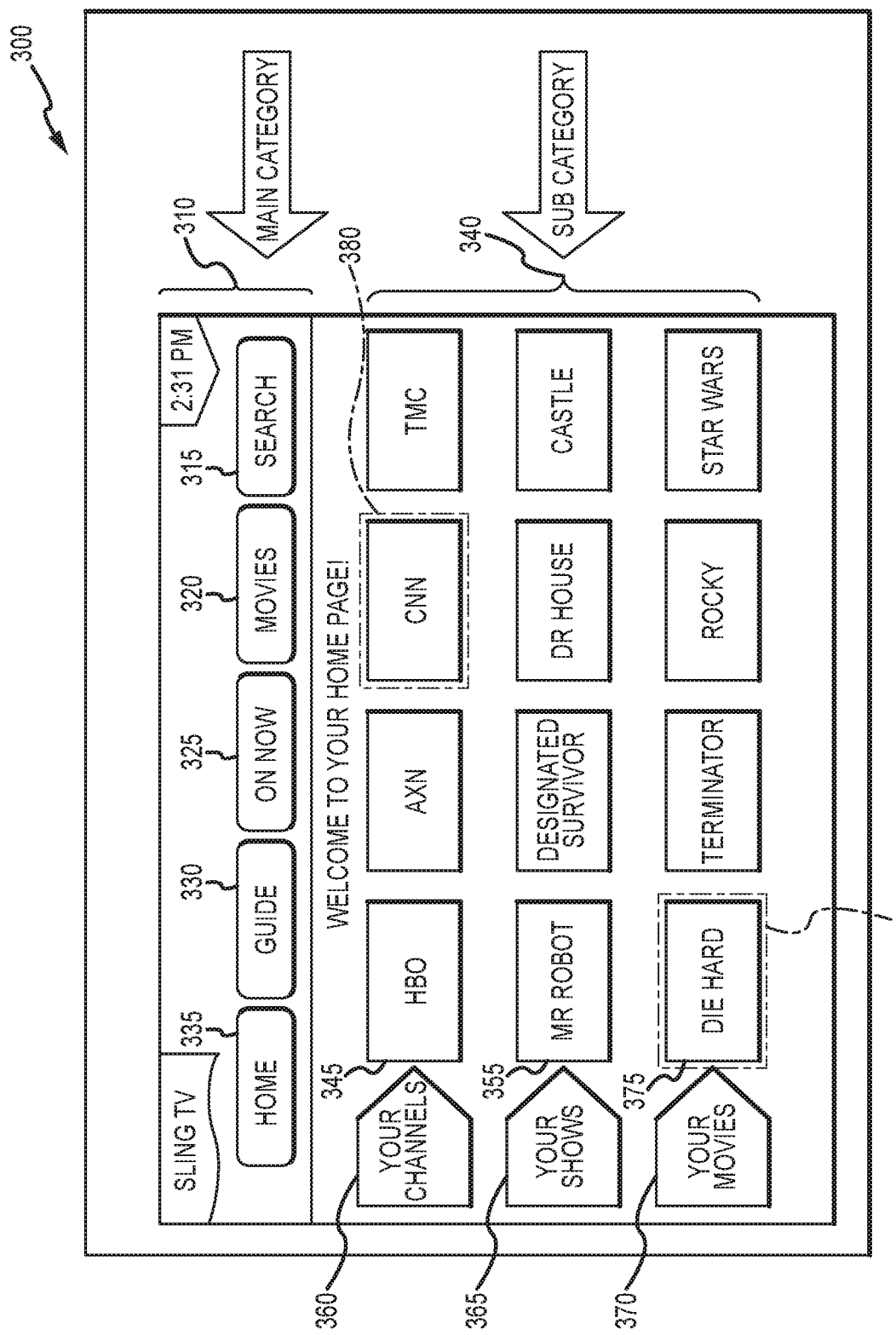
FIG. 3 is a diagram of the application screen layout for use with the remote control device in accordance with an embodiment.

FIG. 3 in an exemplary embodiment of an application screen layout 300 for the SLING® TV™. The application screen layout 300 includes various categories 310 with the labels home 335, guide 330, On now 325, moves 320 and search 315 in a select area of categories 310. In another area of sub category 340, the application screen layout 300 includes a "welcome to you home screen which includes the sub category 340 of your channels 360, your shows 365, and your movies 370. In addition, various items are included in the sub category 340, for example an item labeled HBO 345 for your channels 360, an item labeled Mr. Robot 355 for your shows 365 and an item labeled Die Hard 375 for your movies 370.

In various embodiments, a user would be able to use the additional navigation buttons for streaming media content in navigating the application screen layout 300 in a navigation mode. That is, the media streaming buttons that are ordinarily used for only streaming functions can be used to navigate the application screen layout 300 by the user. The additional buttons that are used for both the streaming media and the navigation of the user interface can be enabled to provide various shortcuts for navigating the application screen layout 300. In an exemplary embodiment, the shorts provided by these multi-functional buttons may include hopping or moving consecutively in categories 310 while a select feature 380 is navigated using the multi-directional button in the sub category area of the sub category 340. That is, the user by actuating one of the multi-function buttons may, while navigating the sub category of sub category 340, switch categories 310 without having to navigate up to the categories 310 section. In such instance, the select feature 380 would remain in the sub category area of sub category 340 while the categories 310 area would change and another sub category 340 of subcategory area of a particular sub category 340 would be displayed associated with appropriate category 310 area. Hence, the multi-function button enhance the ability of the user to navigate quickly the items in the on the application screen layout 300 by allowing the user to quickly cycle through various categories 310 with a minimum number of button actuations or button strokes. In addition, the user can quickly search 315, select a guide 330, go home 335 and revert back if desired using the shortcuts provided by the multi-functional buttons. That is, the user may program the additional multi-function buttons for navigation using key strokes on the application screen layout 300 and link the key strokes to the multi-function buttons.

Figure 4:
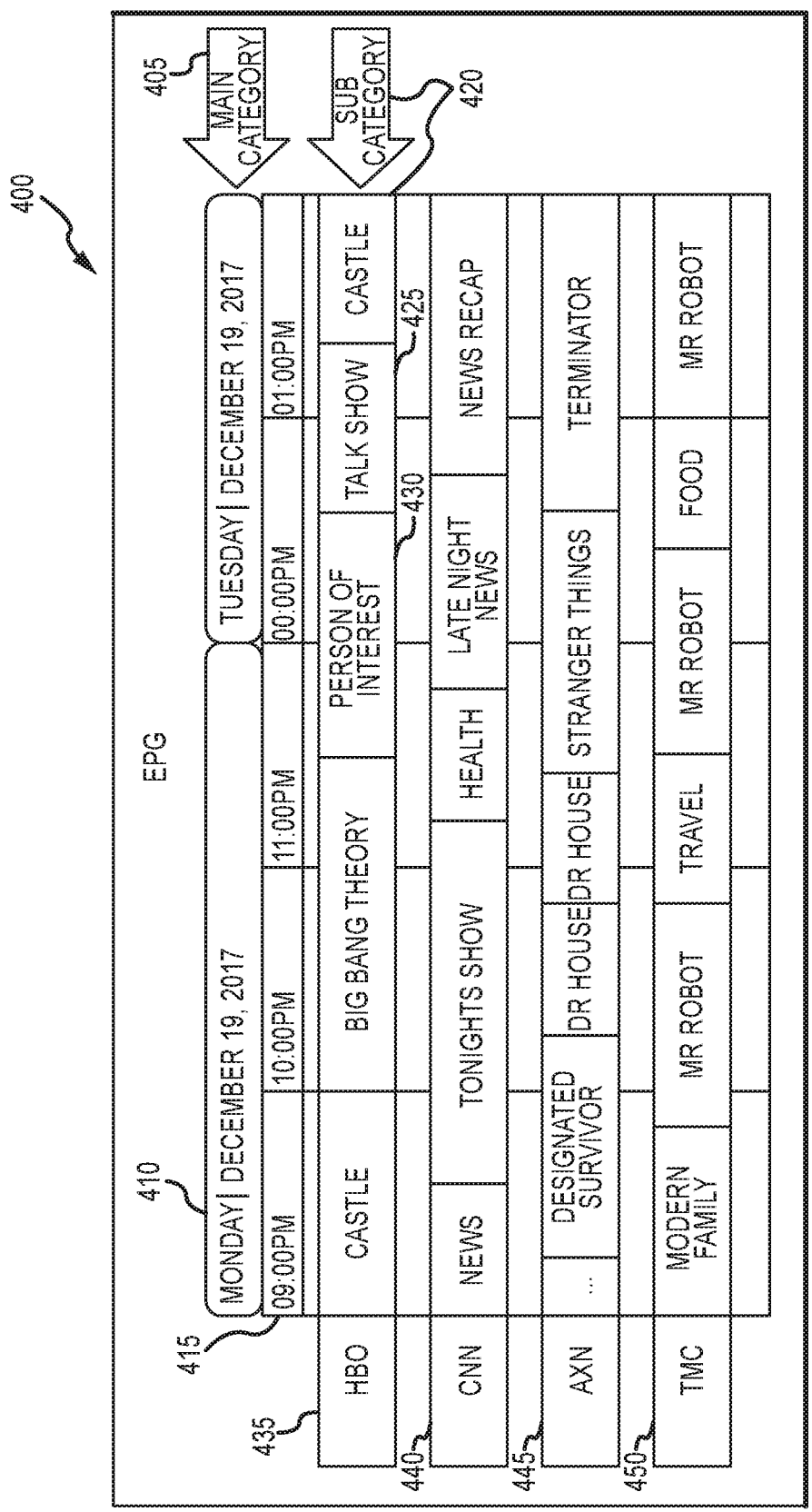
FIG. 4 is a diagram of the electronic program guide (EPG) for use with the remote control device in accordance with an embodiment.

FIG. 4 shows the an electronic program guide (EPG) 400 for navigation using the multi-function buttons in accordance with an exemplary embodiment. In FIG. 4, the EPG 400 includes a main category of category 405 and a sub category 420. The main category of category 405 includes hourly time frames 415 and daily time frames 410. For example, a daily time frames 410 is labeled as "Monday, Dec. 19, 2017" and the associated hourly time frames 415 is labeled "09;00 pm". The sub category 420 include categories labeled HBO® 435, CNN® 440, AXn 445 and TMC® 450. Additionally, in each of the sub category 420 there are associated items such as with the HBO® 435, an item labeled "person of interest" 430, an item labeled "talk show" 425 etc.

In an exemplary embodiment, the user may use one of the multi-function buttons as shortcut to skip preset hourly time periods in the category 405 which using the multi-directional button to navigate within the sub category 420. For example, in the category 405, by various actuations of the additional buttons configured for multi-function use, when navigating a section of the EPG, the user could page by days in a horizontal direction to the next consecutive day without having to proceed item by item at the sub category 420 level saving time and button strokes. In addition, the user can skip various time period at the category 405 level. For example at a time frame of 415, the user could skip to the next time frame in a 12 hour time period or in a 24 hour time period at the category 405 level using actuations of the multi-function buttons at the category level of category 405. In addition, the user using various shortcuts may page down or up in the vertical direction on the EPG without having to proceed in an item by item step through each of the sub category 420; for example, the user may have shortcuts programmed to skip from the HBO 435 to the TMC 450 etc. . . . Hence, the additional buttons of the multi-function buttons used now in a mode of navigating the user interface of the EPG 400 allow for more customized surfing of the EPG 400 and faster selection and viewing of the content on the EPG 400. Further, users are able to see content on the EPG 400 with a few short button strokes that it would require many actuations of the customary buttons used for navigating the EPG 400 in a step by step manner of the consecutive categories of category 405 or sub category 420.

Figure 5:
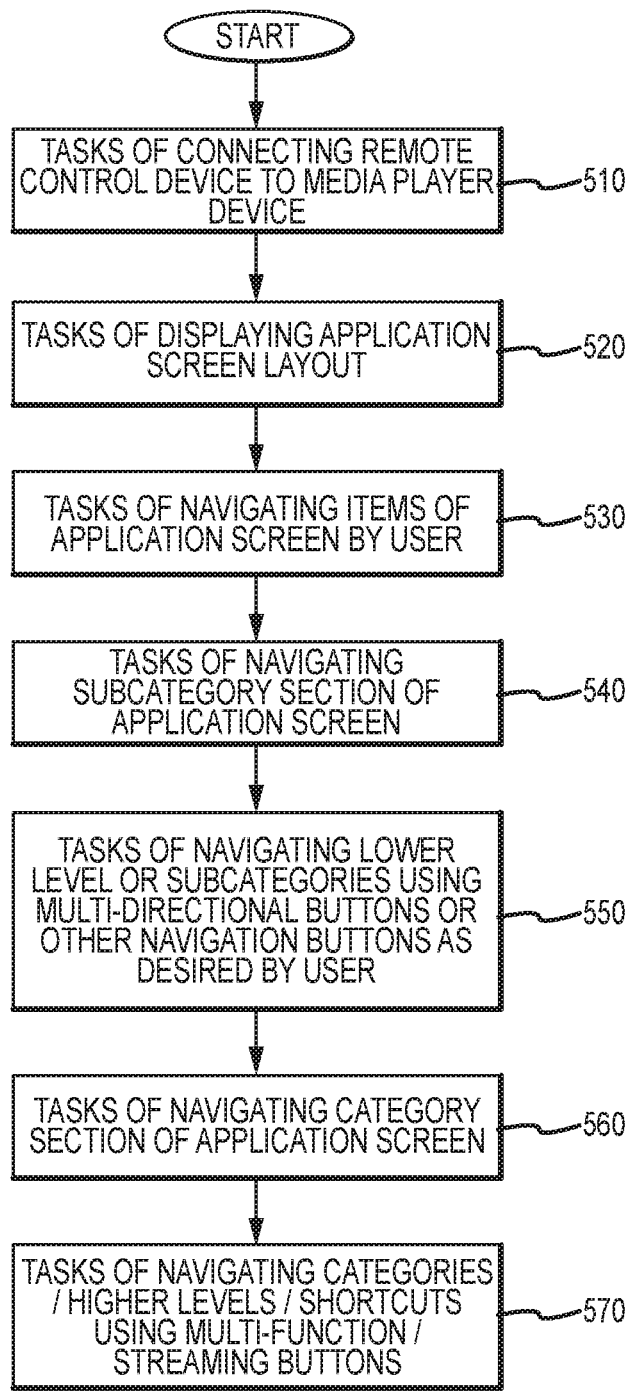
FIG. 5 is flowchart of task associated with operating the remote control device in accordance with an embodiment.

FIG. 5 is a flowchart illustrating an exemplary process for implementing an embodiment of the present disclosure. At task 510 o FIG. 5, the remote control device is connected to a media player device of enabling the remote control device to actuate various commands to the media player device. At task 520, the displaying of the application screen which is the layout of the items divided in at least one or more sections for viewing and selecting media content for viewing and recording by the user. In various embodiments, the application screen layout may be displayed on various display devices or multiple display devices and the remote control device may be enabled to allow selection and command operations on one or more of these display devices. At task 530, a user as desired may navigate the items of the application screen using the various functional buttons on the remote control device. That is, the user may use the conventional buttons for navigating the user interface of the application screen in the vertical and horizontal directions. In addition, the user may use the added buttons ordinarily designated for streaming operations of the content media which are now can be used to navigate the user interface of the application screen as well. These added buttons perform a multi-function operation of still be capable of being used to operate the commands associated with the viewing of the streaming media content upon selection of an item of content for the streaming media. Hence, while the media player is displaying streaming media content, the added buttons or multi-function buttons enable a user to control the viewing operations of the streaming media content. While when the an item of the media content is not selected for viewing, the buttons operate in another mode and are enabled by a software code to allow for a user to navigate as desired the application screen. In various exemplary embodiments, the multi-function buttons may be used for providing short cuts or for navigating different levels in an user interface than the navigation buttons used for navigation.

At task 540, a user may navigate the subcategories section of the application screen using the buttons for navigation ordinarily defined on the remote control device. That is, the buttons that are in general exclusive for the navigation function and not used in the streaming operations of the media content. At task 550, a user may navigate the lower level or sub category section of the application screen using a multi-directional button and press the directional tabs of the multi-directional button to navigate in up and down, as well as right and left directions of various items on the screen. At task 560, the user may choose to navigate a higher level of the application screen displayed and actuate one of the multi-function buttons to navigate this different section. In addition, if other levels or sections are display in various embodiments, the user may use the multi-function buttons to navigate or move to these other sections. At 560, the user may navigate the category section of the application screen using the multi-function buttons while the navigation are still associated with the selection feature in the sub category area. That is, as the user flips through different screens of the screen application, the category section changes, but the location or section of the navigation button with the selection item feature would not change. Hence, in another category at task 560, the user can switch buttons and continue to navigate in the subcategory section without having to move the selection feature from the category section using the multi-direction button in a step by step, item by item manner which in turn saves selection responses on the part of the user and allows for quick navigations in various sections of the application screen. At task 570, the user uses navigates through each of the categories or uses short cuts or navigates high levels in the application screen using the multi-function buttons.

Figure 6:
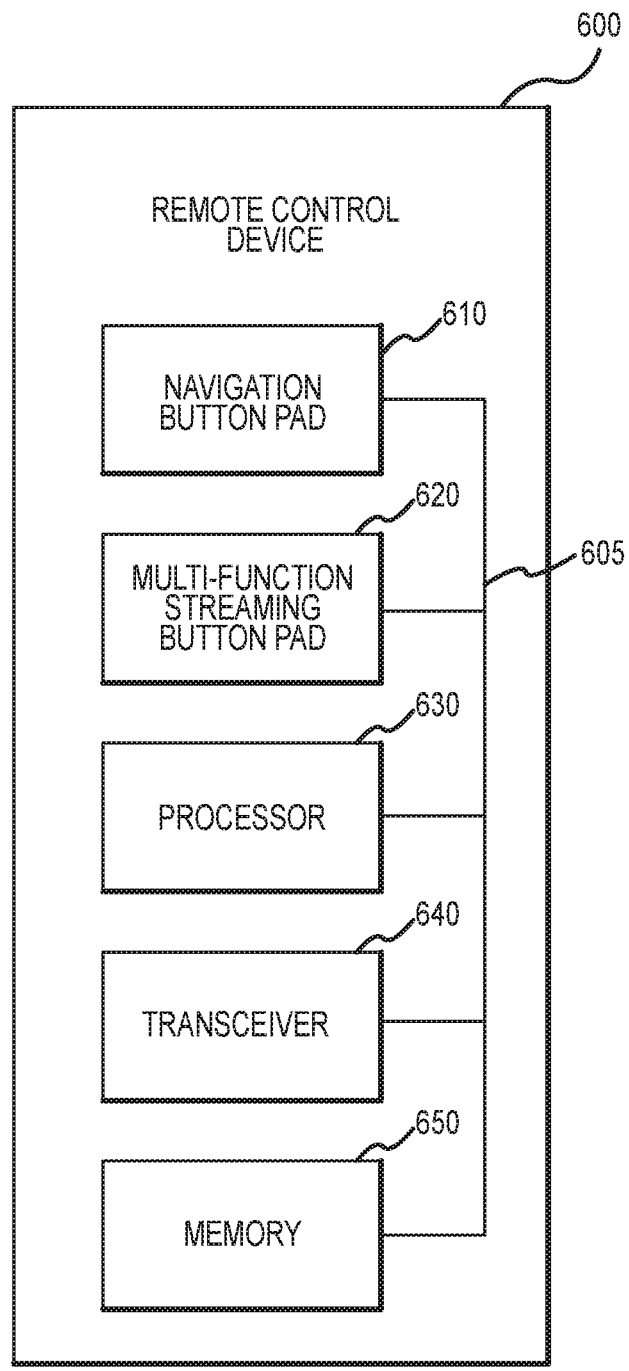
FIG. 6 is diagram of the components of the remote control device in accordance with an embodiment.

FIG. 6 is a remote control device 600 in accordance with an exemplary embodiment. The remote control device 600 of FIG. 6 includes a bus 605 coupling various components of the remote control device 600. The components of the remote control device 600 include a navigation button pad 610 coupled to the bus 605, a multi-function/streaming button pad 620 coupled to the bus 65, a processor 630 coupled to the bus 605, a transceiver 640 coupled to the bus 605, and a memory 6500 coupled to the bus 605. FIG. 6. is not limited to the particular components illustrated and various embodiments may include additional components included for various added functionalities including a power supply, LED indicators, power button etc. In various embodiments, the processor 630 by software application solutions determines signals received from user actuations of buttons of the navigation button pad 610 and the multi-function/streaming button pad 620 for generating commands and operations related to navigating and selecting items on the screen applications. In another mode, the processor 630 by software application solutions determines signals received from user actuations of buttons of the multi-function/streaming button pad 620 for generating commands and operations related to streaming of media content from the media player device (not shown). In addition, software application executed by the processor 630 may be locally stored in memory 650. Also, updates and new instructional sets for the software applications executed by the processor 630 may be downloaded via the transceiver 640 coupled to the processor 630 via the bus 605 and to the media player device. In some instances, a remote control device 600 not containing the software applications for the multi-function operations of the multi-function buttons of multi-function/streaming button pad 620 may be downloaded automatically or at the user's discretion. For example, in legacy devices, the application software may be downloaded for execution by the processor 630 to provide the enhanced multi-function button operations.

Various exemplary embodiments allow the multi-function buttons to be programmed to connect to apps such as the Netflix®, YouTube®, Google® play, Rdio® without the need for separate buttons on the remote control device. It is contemplated that any variety of shortcuts may be programmed into the multi-function buttons for directly connecting to apps desired by the user.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. An apparatus to enable display of media content, the apparatus comprising:
    a remote control device;
        a button pad with a set of buttons for both controlling a media player device and for navigating an user interface on a display device connected to the media player wherein the set of buttons comprises at least a plurality of buttons to navigate an user interface on a display device, and to display streaming media content on the display device wherein the button pad is part of the remote control device, the button pad further comprising:
    a first button which comprises a single multi-directional button ordinarily designated to navigate the user interface in a navigation mode in single level or single consecutive item steps by an actuation of a tab of the single multi-directional button;
    a second set of buttons which comprise a first, second and third button to perform a back operation, a guide operation and a menu operation; and
    a third set of buttons which comprise a first, second and third button ordinarily designated to play streaming media content but configurable to mimic similar types of operations of the second set of buttons of the back operation, the guide operation, and the menu operation, and configurable for use in the navigation mode to navigate the user interface in operation with the single multi-directional button, wherein the third set of buttons is configurable by a first button of the third set of buttons to extend back operations by a fast reverse play by enabling a first programmed button of the third set of buttons to skip more than one step in the back operation than what is performed by a single step operation of the back operation by the second set button and a second button of the third set of buttons to extend the fast forward play by enabling a second programmed button of the third set of buttons to skip more than one step in the fast forward play operation to navigate multiple consecutive items in the user interface in the navigation mode by a single actuation and also to alternately be programmed to navigate to a different level in the user interface in the navigation mode by a single actuation in contrast to the single level and item actuations enabled upon the actuation of the tab of the single multi-directional button.

2. The apparatus of claim 1, further comprising:
    an user interface comprising: at least a first and second level wherein the first level is associated with a category and the second level is associated with a subcategory.

3. The apparatus of claim 2, further comprising:
    the third set of buttons to navigate the first level of the user interface in a horizontal or vertical direction, and to operate in conjunction with the single multi-directional button by playing a particular streamed media content selected in the second level by the single multi-directional button.

4. The apparatus of claim 3, further comprising:
    the multi-function button to navigate the second level of the user interface in the horizontal and vertical to select particular streamed media content.

5. The apparatus of claim 4 wherein the first level are items which comprise: a set of categories of plurality of applications with corresponding time periods for particular applications associated with streamed media content.

6. The apparatus of claim 5 wherein the second level comprise: a set of sub-categories which further comprise: a set of types of streamed media content of: programs, shows, and channels.

7. A method of managing displaying of media content, comprising:
    configuring a remote control device with a button pad with a set of buttons for both controlling a media player device and for navigating an user interface on a display device coupled to the media player device wherein the set of buttons comprises at least a plurality of buttons to navigate an user interface on a display device, and to display streaming media content on the display device, the button pad further comprising:
    configuring a first set of buttons comprising: a single multi-directional button to navigate the user interface in a navigation mode in either a single level or a single consecutive item step by an actuation of a tab of the single multi-directional button;
    configuring a second set of buttons comprising a first, second and third button to perform a back operation, a guide operation and a menu operation; and
    a third set of buttons comprising a first, second and third button ordinarily designated to play streaming media content but configurable for mimicking similar types of operations of the second set of buttons of the back operation, the guide operation, and the menu operation, and also configurable for use in the navigation mode for navigating the user interface in operation with the single multi-directional button, wherein the third set of buttons is configurable by a first button of the third set of buttons for extending back operations by a fast reverse play by enabling a first programmed button of the third set of buttons for skipping more than one step in the back operation than what is performed by a single step operation of the back operation by the second set button and a second button of the third set of buttons for extending the fast forward play by enabling a second programmed button of the third set of buttons for skipping more than one step in the fast forward play operation for navigating multiple consecutive items in the user interface in the navigation mode by a single actuation and alternately being programmed for navigating to a different level in the user interface in the navigation mode by a single actuation in contrast to the single level and item actuations enabled upon the actuation of the tab of the multi-directional button.

8. The method of claim 7, wherein the third set of buttons are multi-function buttons enabling in one mode navigating of the user interface and in another mode playing streaming media content wherein in the navigation mode the third set of buttons operates in conjunction with the first set of buttons for navigating the user interface.

9. The method of claim 7, further comprising:
configuring an user interface with at least a first and second level wherein the first level is associated with a category and the second level is associated with a subcategory for navigating simultaneously by actuations of the first, second and third set of buttons.

10. The method of claim 9, further comprising:
configuring a third set of buttons to navigate the first level of the user interface in a horizontal or vertical direction, and to play, when not operating in the navigation mode, a particular streamed media content selected in the second level by the single multi-directional button.

11. The method of claim 10, further comprising:
configuring the first set of buttons to navigate the second level of the user interface in the horizontal and vertical and to select a particular streamed media content wherein actuations by multi-functional operations of the third set of buttons, the selected particular streamed media content is played.

12. The method of claim 11 wherein the first level are items which comprise: a set of categories of plurality of applications and corresponding time periods for particular applications associated with streamed media content.

13. The method of claim 12 wherein the second level are sub-categories which comprise: a set of types of streamed media content comprising: programs, shows, and channels.

14. The method of claim 8, further comprising:
updating functionalities of the first and second sets of buttons by downloading software applications by communications with a network for configuring at least the third set of buttons to navigate the user interface and to play streaming media content.

15. A video presentation system comprising:
a receiver to receive data associated with streaming media content;
a display operatively coupled to the receiver for presenting the streaming media content; and
a remote control operatively coupled to the receiver with a set of buttons that performs more than one type of action of actions associated with controlling the display of the streaming media content and associated with navigating an application screen for selection of streaming media content by enabling short-cuts to navigate to skip multiple consecutive items in the application screen by a single actuation;
the application screen comprising: at least a first and second level wherein the first level is associated with a category item of a category area and the second level is associated with a subcategory item of a subcategory section;
a first set of buttons ordinarily designated to navigate the application screen;
a second set of buttons to perform a back operation, a guide operation and a menu operation; and
a third set of buttons designated for multi-function operations to play streaming media content, to operate with the first set of buttons to navigate the application screen, and to operate with the second set of buttons to perform back operations by shortcut operations of hopping or moving consecutively in category items while navigating the application screen while a select feature is navigated using the multi-directional button in the subcategory section of subcategory items of the application screen whereby a user by actuating one of the multi-function buttons navigates each subcategory item of the subcategory section and switches categories without having to navigate up to the categories section using the third set of buttons wherein the select feature remains in the subcategory section of a particular subcategory item while the category area can change to another subcategory item of in another subcategory area.

16. The system of claim 15, further comprising:
the first set of buttons to navigate the second level of the user interface in the horizontal and vertical direction and to select a particular streamed media content wherein actuations by multi-functional operations of the third set of buttons, the particular streamed media content is played.

17. The system of claim 16 wherein the first level are category items which comprise: a set of categories of plurality of applications and corresponding time periods for particular applications associated with streamed media content, and the second level are subcategory items which comprise: a set of types of streamed media content comprising: programs, shows, and channels.

\* \* \* \* \*